United States Patent [19]
Muto

[11] Patent Number: 6,130,791
[45] Date of Patent: Oct. 10, 2000

[54] MAGNETIC DISK DRIVE HAVING READ CHANNEL IN WHICH LOW-FREQUENCY CUTOFF IS SET RELATIVELY HIGH TO COPE WITH THERMAL ASPERITY

[75] Inventor: Hiroshi Muto, Kawasaki, Japan

[73] Assignee: Fujitsu Limited, Kawasaki, Japan

[21] Appl. No.: 08/999,481

[22] Filed: Dec. 29, 1997

[30] Foreign Application Priority Data

Jun. 9, 1997 [JP] Japan ..................................... 9-151194

[51] Int. Cl.[7] ........................................................ G11B 5/09
[52] U.S. Cl. ................................ 360/46; 360/65; 360/67; 360/77.02
[58] Field of Search .................................. 360/65, 46, 67, 360/77.02, 78.09; 375/232

[56] References Cited

U.S. PATENT DOCUMENTS 5,463,603  10/1995  Petersen ..................................... 360/65
5,684,651  11/1997  Yaegashi et al. ........................... 360/65

FOREIGN PATENT DOCUMENTS

| 61-17218 | 1/1986 | Japan . |
| 540905 | 2/1993 | Japan . |
| 5114260 | 5/1993 | Japan . |
| 620413 | 1/1994 | Japan . |
| 7141807 | 6/1995 | Japan . |

Primary Examiner—Alan T. Faber
Attorney, Agent, or Firm—Greer, Burns & Crain, Ltd.

[57] ABSTRACT

A magnetic disk drive includes a circuit portion having transfer characteristics for determining low-frequency cutoff characteristics in a transfer line ranging from a signal output terminal P1 of a head to a branch portion P2 between a data demodulation circuit and a servo demodulation circuit, and an equalization circuit having transfer characteristics having the relation of an inverse function to low-frequency portion of the transfer characteristics between P1 and P2, disposed in the transfer line ranging from the branch portion to the servo demodulation circuit. This circuit constitution can reduce waveform distortion of servo signals at the time of reproduction and can improve the positioning accuracy of the head.

5 Claims, 5 Drawing Sheets

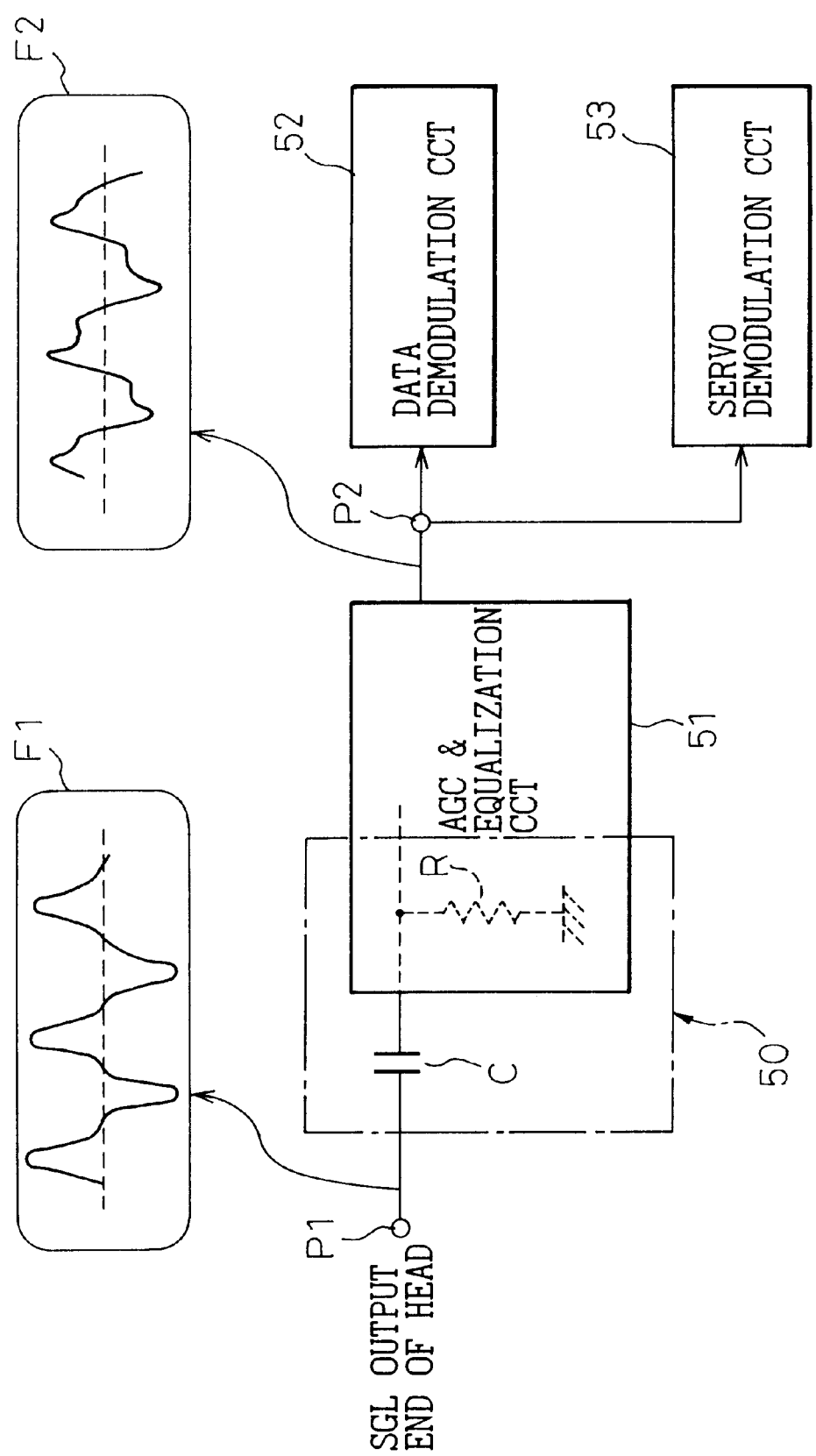

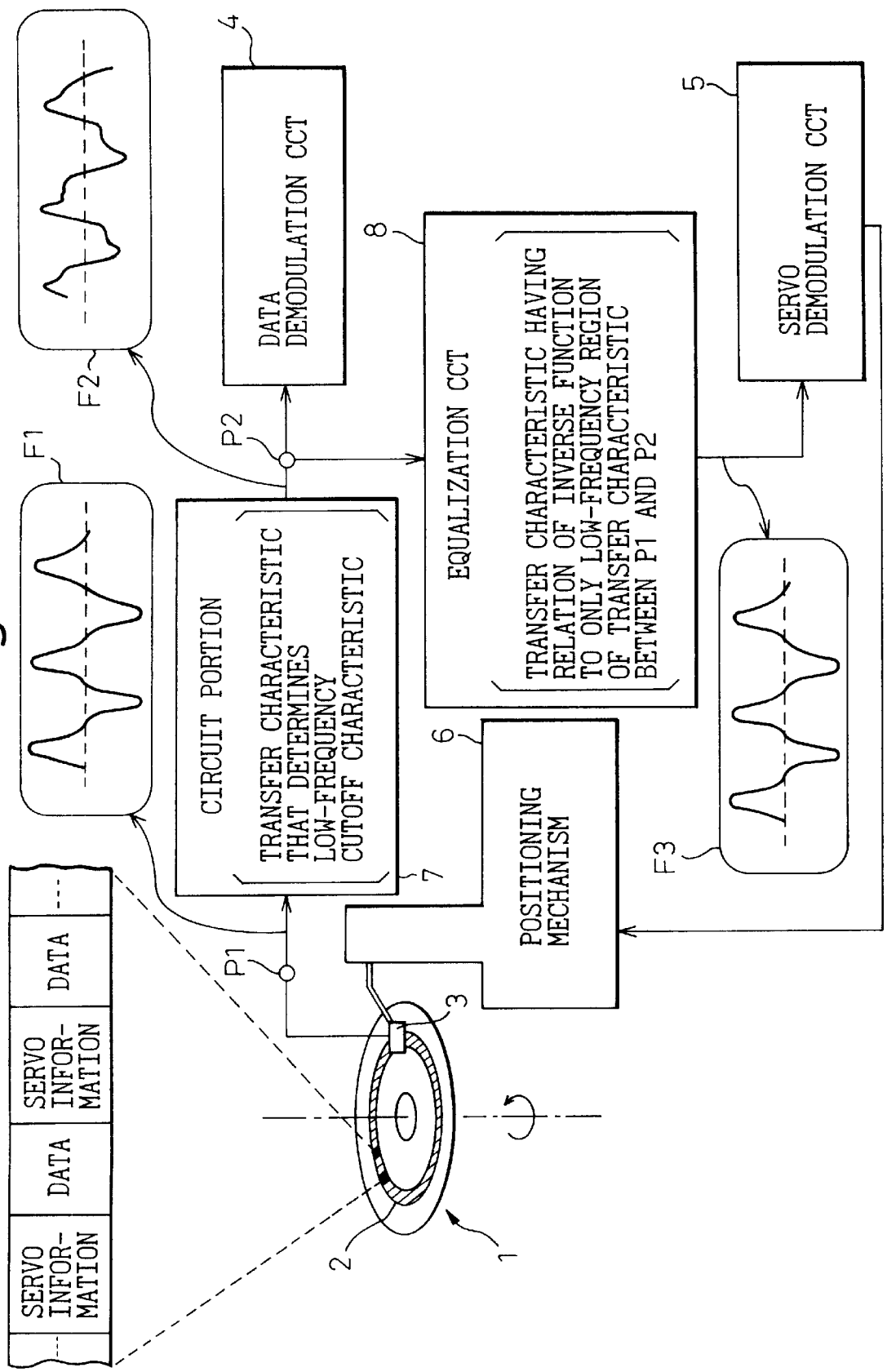

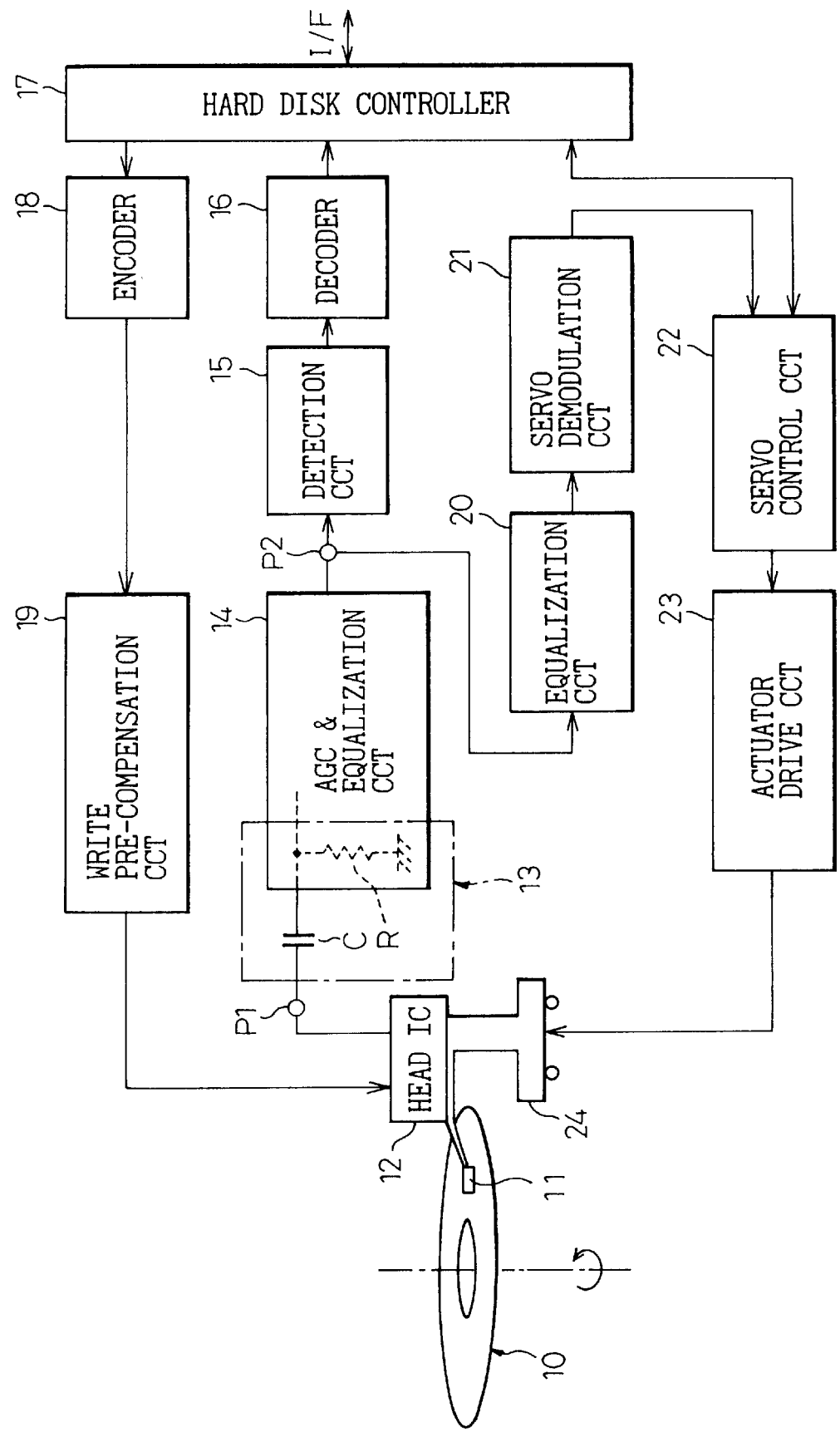

MAGNETIC DISK DRIVE HAVING READ CHANNEL IN WHICH LOW-FREQUENCY CUTOFF IS SET RELATIVELY HIGH TO COPE WITH THERMAL ASPERITY

BACKGROUND OF THE INVENTION

1. Field of the Invention

This invention relates to a sector servo system magnetic disk drive which reads a data signal and a servo signal by the same head. More particularly, this invention relates to a signal processing system having a read channel in which low-frequency cutoff is set relatively high so as to cope with a thermal asperity that is observed in a magnetic disk drive using a magnetoresistance effect type head (MR head) as the head.

2. Description of the Related Art

Recently, a technology for reducing a floating distance of an MR head has been employed to increase the recording density. On the other hand, microscopic protuberances frequently develop on the surface of a disk medium due to changes with time. In such a case, these protuberances collide with the MR head and the heat friction occurring thereby causes fluctuation of the waveform of a reproduction signal (which is referred to as "thermal asperity"). To cope with such a thermal asperity, a low-frequency cutoff frequency has been set to a higher level than in ordinary cases in the past. In a sector servo system magnetic disk, however, both the data signal and the servo signal receive the same low-frequency cutoff. Consequently, the problem occurs in that the waveform of the servo signal using a lower frequency band than the data signal undergoes distortion and the accuracy of positioning the head, which is effected by demodulating this servo signal, drops. Therefore, a technology which prevents such a problem, even when the low-frequency cutoff frequency is set high as a counter-measure to thermal asperity, has been required.

FIG. 1 exemplarily shows the constitution of a signal processing system of a sector servo system magnetic disk drive as a example of the prior art technology.

In the drawing, symbol P1 represents a signal output terminal from which a data signal and a servo signal reproduced by a head (not shown) are outputted. The data signal and the servo signal are obtained by reproducing the data recorded on tracks formed into concentric circles on a disk (not shown) and servo information so recorded as to divide the data areas on the tracks, respectively, and they are outputted to the signal output terminal P1 at mutually different timings. Incidentally, the signal waveform F1 shown in the drawing represents the waveform of the servo signal, and it has a frequency component lower (by about 1/10) than that of the data signal.

Reference numeral 50 denotes an AC coupling portion for imparting low-frequency cutoff characteristics to the reproduction signal outputted to the signal output terminal P1 of the head, and reference numeral 51 denotes an AGC-and-equalization circuit. As shown in the drawing, the AC coupling portion 50 comprises a coupling capacitance C and an input equalization resistance R of the AGC-and-equalization circuit 51. Therefore, the low-frequency cutoff characteristics given to the reproduction signal are determined by the time constant of the capacitance C and the resistance R that constitute this AC coupling portion 50.

Reference numeral 52 denotes a data demodulation circuit, reference numeral 53 denotes a servo demodulation circuit, and symbol P2 represents a branch portion between the data modulation circuit 52 and the servo demodulation circuit 53. Among the reproduction signals which are subjected to a predetermined signal amplification and to waveform equalization, the data signal is demodulated and digitized by the data demodulation circuit 52 and is outputted to a host controller (not shown). On the other hand, the servo signal is demodulated by the servo demodulation circuit 53 (or demodulated and digitized) and is sent to a head positioning mechanism. In this way, the head is positioned to any of the tracks on the disk.

According to the prior art technology described above, a circuit portion (AC coupling portion 50 and AGC-and-equalization circuit 51) having transfer characteristics which determine the low-frequency cutoff characteristics exists in the transfer line ranging from the signal output terminal P1 of the head to the branch portion P2 between the data demodulation circuit 52 and the servo demodulation circuit 53. Therefore, both of the data signal and the servo signal outputted to the signal output terminal P1 of the head receive the same low-frequency cutoff. The low-frequency cutoff characteristics are determined by the time constant (CR) of the AC coupling portion 50 as described above.

It has been customary to set the low-frequency cutoff frequency relatively high as a counter-measure against the thermal asperity as described already. To set this low-frequency cutoff frequency to a high level, the time constant (CR) of the AC coupling portion 50 must be set to a small value.

When the time constant (CR) is set to a small value, however, distortion of the waveform occurs due to a phase change, etc, of the low-frequency cutoff characteristics in the servo signal using a lower frequency band than the data signal (see signal waveform F2 in FIG. 1). In consequence, the problem develops in that head positioning accuracy of this servo signal drops.

SUMMARY OF THE INVENTION

It is an object of the present invention to provide a sector servo system magnetic disk drive which can reduce waveform distortion of a servo signal at the time of reproduction and can eventually contribute to an improvement in positioning accuracy of a head.

According to the present invention, as shown in FIG. 2, there is provided a magnetic disk drive comprising a disk 1 driven for rotation; a head 3 for reproducing data recorded on tracks 2 formed into concentric circles on the disk and servo information so recorded as to divide the areas of the data on the track; a data demodulation circuit 4 for processing the data signals reproduced by the head 3; a servo demodulation circuit 5 for processing the servo signals reproduced by the head 3; a positioning mechanism 6 for positioning the head 3 on the tracks 2 on the basis of the output of the servo demodulation circuit 5; at least one circuit portion 7 disposed in a first transfer line ranging from a signal output terminal P1 of the head 3 to a branch portion P2 between the data demodulation circuit 4 and the servo demodulation circuit 5, and having transfer characteristics for deciding low-frequency cutoff characteristics; and an equalization circuit 8 disposed in a second transfer line ranging from the branch portion P2 to the servo demodulation circuit 5; wherein the equalization circuit has transfer characteristics having an inverse function with respect to low-frequency portion of the transfer characteristics between P1 and P2.

According to the constitution of the magnetic disk drive of the present invention, the equalization circuit 8 having the transfer characteristics for correcting the low-frequency cutoff characteristics of the transfer line from the signal output terminal P1 of the head 3 to the branch portion P2 is disposed in the transfer line from the branch portion P2 between the data demodulation circuit 4 and the servo demodulation circuit 5 to the servo demodulation circuit 5. Therefore, the low-frequency cutoff characteristics in the transfer line from the signal output terminal P1 of the head 3 to the servo demodulation circuit 5 can be apparently improved.

In other words, the low-frequency cutoff frequency of the servo system ranging from the signal output terminal P1 of the head 3 to the servo demodulation circuit 5 can be set to a value different from the low-frequency cutoff frequency of the data system ranging from the signal output terminal P1 of the head 3 to the data demodulation circuit 4, or in other words, can be set independently and moreover, to a lower value.

Accordingly, it becomes possible to reduce the waveform distortion of the servo system using a lower frequency band than the data signal, due to the phase change, etc, of the low-frequency cutoff characteristics. In FIG. 2, the servo signal waveform F2 that contains the waveform distortion at the branch portion P2 has a signal waveform distortion F3, which is substantially equal to the original normal signal waveform F1, after it is passed through the equalization circuit 8. Consequently, positioning accuracy of the head, conducted by demodulating the servo signal, can be remarkably improved.

BRIEF DESCRIPTION OF THE DRAWINGS

Other objects and features of the present invention will be hereinafter described in detail by way of preferred embodiments with reference to the accompanying drawings, in which:

FIG. 1 shows the constitution of a signal processing system in a magnetic disk drive as an example of the prior art technology;

FIG. 2 shows the principle and constitution of a magnetic disk drive according to the present invention;

FIG. 3 is a block diagram showing partially and schematically the constitution of a magnetic disk drive according to an embodiment of the present invention;

DESCRIPTION OF THE PREFERRED EMBODIMENTS

Figure 4A:
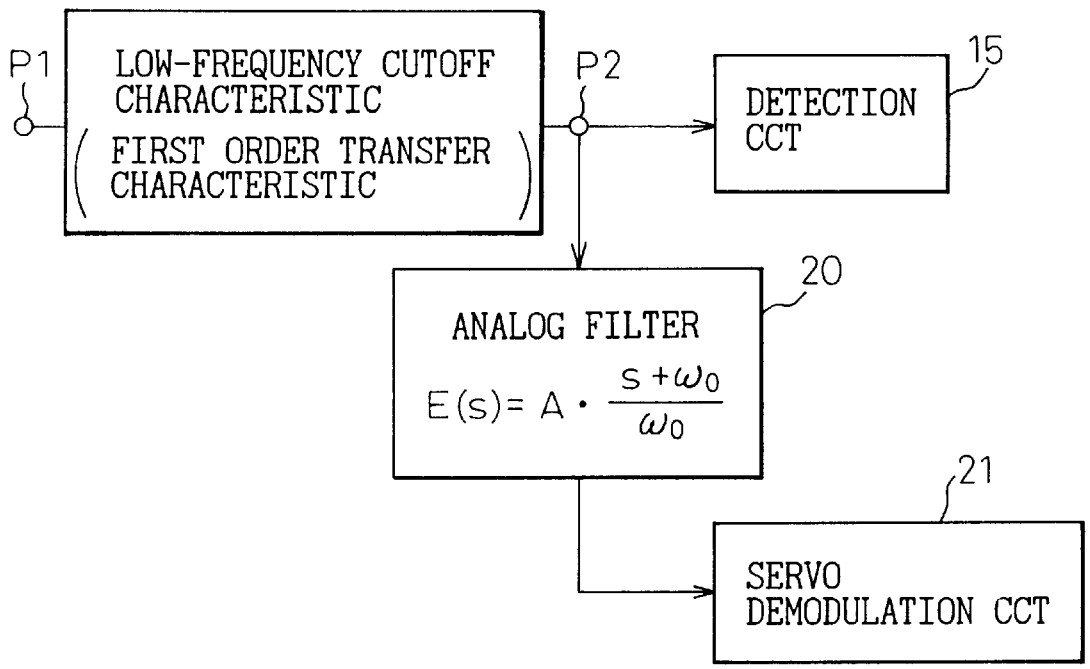
FIGS. 4a and 4b are block diagrams showing a structural example of an equalization circuit shown in FIG. 3.

FIG. 3 shows partially and schematically the constitution of a magnetic disk drive of a sector servo system according to one embodiment of the present invention.

In FIG. 3, reference numeral 10 denotes a disk which is driven for rotation by a spindle motor (not shown), reference numeral 11 denotes an MR head for reproducing data recorded on tracks formed in concentric circles on the disk 10 and servo information recorded in such a manner as to divide the data areas on the track, reference numeral 12 denotes a head IC for processing the signals reproduced by the MR head 11, P1 denotes a signal output terminal through which the data signals and the servo signals reproduced by the MR head 11 are outputted, reference numeral 13 denotes an AC coupling portion for imparting low-frequency cutoff characteristics to the reproduced signals outputted at the signal output terminal P1 of the MR head 11, and reference numeral 14 denotes an AGC and equalization circuit which amplifies the reproduced signal inputted through the AC coupling portion 13 to a predetermined signal amplitude and executes waveshape equalization. The AC coupling portion 13 comprises a coupling capacitance C and an input equalization resistance R of the AGC and equalization circuit 14.

Symbol P2 represents a branch portion between a data system and a servo system, reference numeral 15 denotes a detection circuit for detecting a data signal inputted through the branch portion P2, reference numeral 16 denotes a decoder for decoding the data signal so detected, reference numeral 17 denotes a hard disk controller functioning as an interface (I/F) between the disk drive of this invention and a host controller (not shown), reference numeral 18 denotes an encoder for encoding a write signal when data is written to the disk 10, reference numeral 19 denotes a write pre-compensation circuit for executing fine adjustment such as waveform equalization for the encoded signal, reference numeral 20 denotes an equalization circuit for executing waveform equalization for the servo signal inputted through the branch portion P2, reference numeral 21 denotes a servo demodulation circuit for demodulating the servo signal subjected to waveform equalization, reference numeral 22 denotes a servo control circuit for generating a servo control quantity necessary for positioning the MR head 11 on the basis of the demodulated servo signal, reference numeral 23 denotes a circuit for driving a head positioning actuator on the basis of the servo control quantity so generated, and reference numeral 24 denotes the head positioning actuator.

In contrast with the structural view of the principle shown in FIG. 2, the AC coupling portion 13 and the AGC-and-equalization circuit 14 correspond to the circuit portion 7, the detection circuit 15 and the decoder 16 correspond to the data demodulation circuit 4, and the servo control circuit 22, the actuator driving circuit 23 and the actuator 24 correspond to the positioning mechanism 6.

Incidentally, the processing of the data signal and the servo signal outputted to the signal output terminal P1 by the MR head 1 is the same as the processing of the prior art technology shown in FIG. 1, and its explanation will be therefore omitted.

The feature of this embodiment resides in that the equalization circuit 20 having the transfer characteristics for correcting the low-frequency cutoff characteristics of the transfer line ranging from the signal output terminal P1 of the MR head 11 to the branch portion P2 is disposed in the transfer line extending from the branch portion P2 between the data system and the servo system to the servo demodulation circuit 21.

According to this constitution, the low-frequency cutoff frequency of the servo system ranging from the signal output terminal P1 of the MR head 11 to the servo demodulation circuit 21 can be set to a low value independently of the low-frequency cutoff frequency of the data system ranging from the signal output terminal P1 of the MR head 11 to the data demodulation circuit (detection circuit 15 and decoder 16). In consequence, the problem of the prior art technology (waveform distortion of the servo signal resulting from the phase turn by the low-frequency cutoff characteristics) can be solved. This feature contributes to the improvement in positioning accuracy of the head conducted by demodulating the servo signal.

Figure 4B:
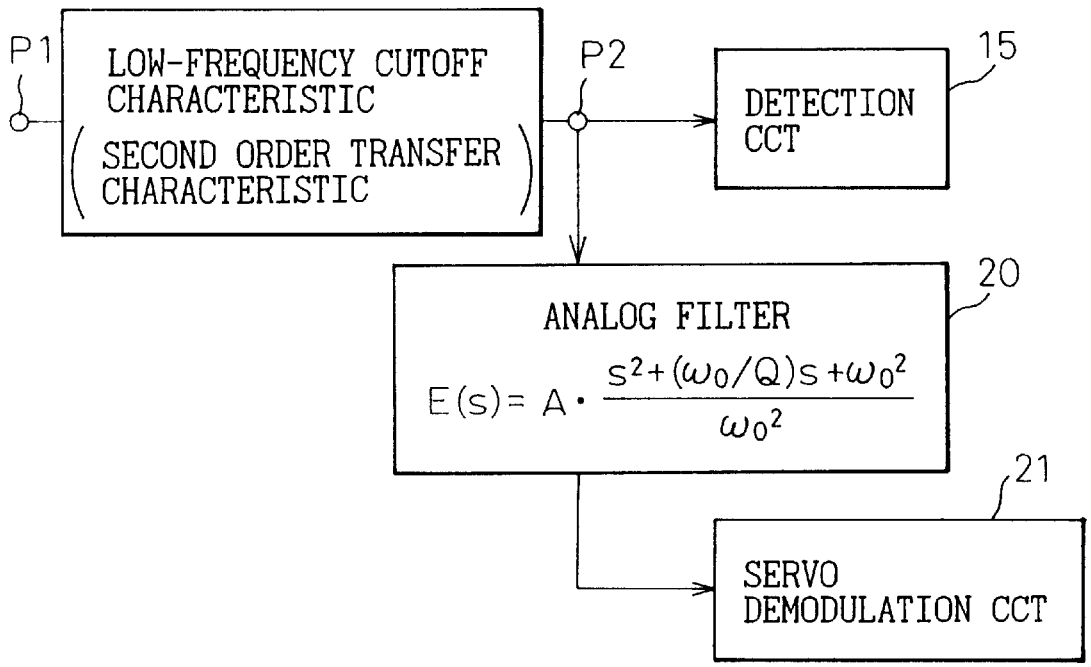

FIGS. 4a and 4b show a structural example of the equalization circuits.

First, FIG. 4a shows a structural example of the equalization circuit 20 when the low-frequency cutoff characteristics of the transfer line ranging from the signal output terminal P1 of the MR head 11 to the branch portion P2 are regarded as primary transfer characteristics. The example shown in this drawing comprises an analog filter having a transfer function expressed by the following equation (1)

$$E(s)=A\cdot(s+\omega_0)/\omega_0 \quad (1)$$

where A is an arbitrary constant and $\omega_0$ is a cutoff angular frequency when the low-frequency cutoff characteristics of the transfer line between P1 and P2 are regarded as a primary transfer function.

FIG. 4b shows another structural example of the equalization circuit 20 when the low-frequency cutoff characteristics of the transfer line between P1 and P2 are regarded as secondary transfer characteristics. The example shown in this drawing comprises an analog filter having a transfer function having the relation of an inverse function to the secondary transfer function described above, and expressed by the following equation (2):

$$E(s)=A\cdot[s^2+(\omega_0/Q)s+\omega_0^2]/\omega_0^2 \quad (2)$$

where A is an arbitrary constant, $\omega_0$ is a cutoff angular frequency when the low-frequency cutoff characteristics in the transfer characteristics between P1 and P2 are regarded as the secondary transfer function and Q is a quality factor (Q=1/$\sqrt{2}$) associated with the gain in the low-frequency cutoff frequency.

Figure 5A:
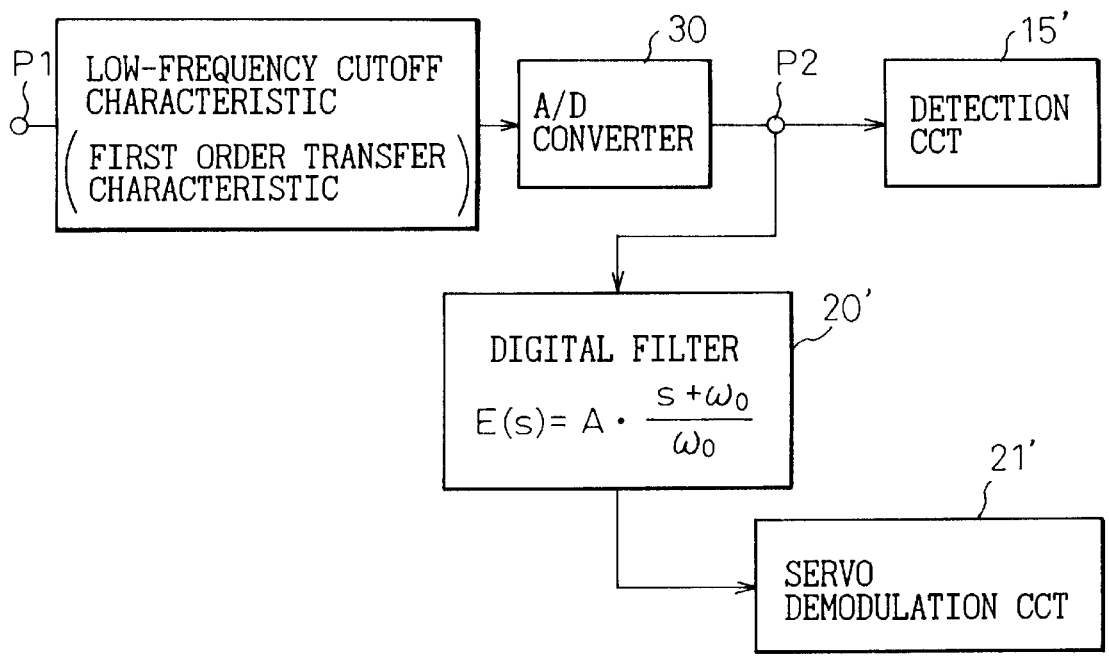
FIGS. 5a and 5b are block diagrams showing a structural example of an equalization circuit according to another embodiment of the present invention.
Figure 5B:
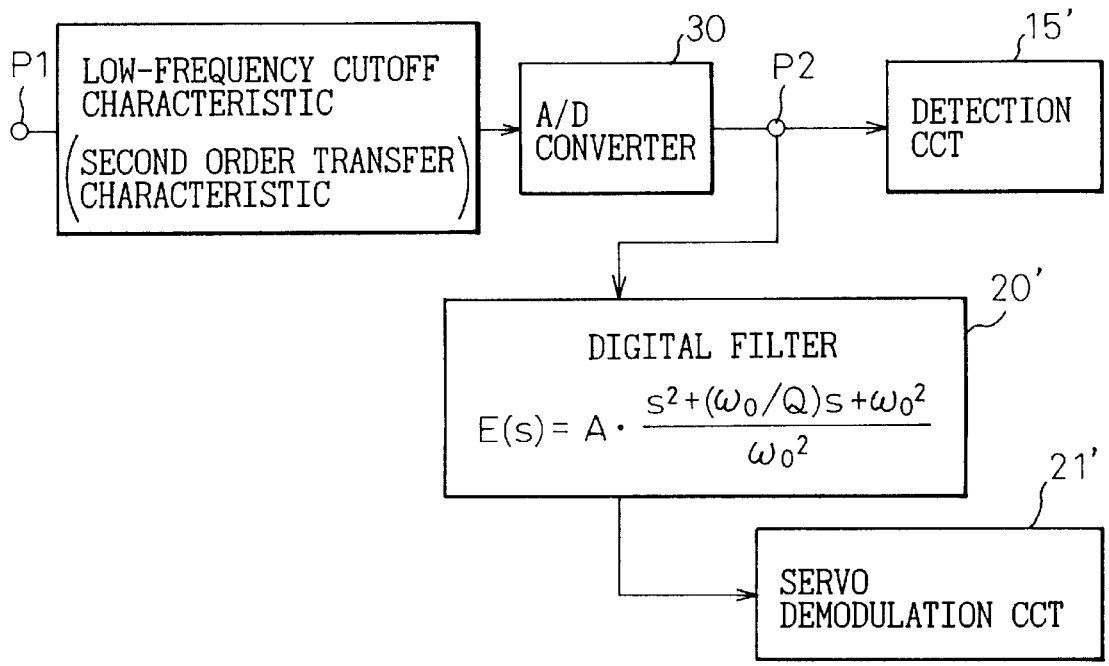

FIGS. 5a and 5b show a structural example of the equalization circuit according to another embodiment of the present invention.

This embodiment is characterized in that an A/D convertor 30 for converting an analog signal to a digital signal is disposed in the transfer line ranging from the signal output terminal P1 of the MR head 11 to the branch portion P2. With the disposition of this A/D convertor 30, the detection circuit 15' and the servo demodulation circuit 21' adapted to process the digital signals are employed in place of the detection circuit 15 and the servo demodulation circuit 21 shown in FIG. 3, respectively.

First, FIG. 5a shows the structural example of the equalization circuit 20' when the low-frequency cutoff characteristics of the transfer line between P1 and P2 are regarded as the primary transfer characteristics. The example shown in this drawing comprises a digital filter having a transfer function having the relation of an inverse function to the primary function described above, that is, the transfer function expressed by the formula (1).

FIG. 5b shows the structural example of the equalization circuit 20' when the low-frequency cutoff characteristics of the transfer line between P1 and P2 are regarded as the secondary transfer characteristics. The example shown in this drawing comprises a digital filter having a transfer function inverse to the secondary function described above, that is, the transfer function having the formula (2).

What is claimed is:

1. A magnetic disk drive comprising:
    a disk driven for rotation;
    a head for reproducing data recorded on tracks formed into concentric circles on said disk and servo information so recorded as to divide the areas of said data on said track;
    a data demodulation circuit for processing the data signals reproduced by said head;
    a servo demodulation circuit for processing the servo signals reproduced by said head;
    a positioning mechanism for positioning said head to said tracks on the basis of an output of said servo demodulation circuit;
    at least one circuit portion disposed in a first transfer line ranging from a signal output terminal of said head to a branch portion between said data demodulation circuit and said servo demodulation circuit, and having transfer characteristics of cutting off low-frequency; and
    an equalization circuit disposed in a second transfer line ranging from said branch portion to said servo demodulation circuit;
    wherein said equalization circuit has transfer characteristics having the relation of an inverse function with respect to a low-frequency portion of the transfer characteristics of said first transfer line.

2. The magnetic disk drive as set forth in claim 1, wherein, when the low-frequency cutoff characteristics in the transfer characteristics of said first transfer line are regarded as a primary transfer function, said equalization circuit comprises an analog filter having a transfer function expressed by the following formula as a transfer function having an inverse relation to said primary transfer function:

$$E(s)=A\cdot(s+\omega_0)/\omega_0$$

where A is an arbitrary constant and $\omega_0$ is a cutoff angular frequency when the low-frequency cutoff characteristics in the transfer characteristics in said first transfer line are regarded as the primary transfer function.

3. The magnetic disk drive as set forth in claim 1, wherein, when the low-frequency cutoff characteristics in the transfer characteristics of said first transfer line are regarded as a secondary transfer function, said equalization circuit comprises an analog filter having a transfer function having the relation of the inverse function to the secondary transfer function and expressed by the following formula:

$$E(s)=A\cdot[s^2+(\omega_0/Q)s+\omega_0^2]/\omega_0^2$$

where A is an arbitrary function, $\omega_0$ is a cutoff angular frequency when the low-frequency cutoff characteristics in the transfer characteristics in said first transfer line are regarded as a secondary function, and Q is a quality factor associated with the gain in the low-frequency cutoff frequency.

4. The magnetic disk drive as set forth in claim 1, wherein, when an A/D convertor is disposed in said first transfer line, said equalization circuit comprises a digital filter having a transfer function expressed by the following formula:

$$E(s)=A\cdot(s+\omega_0)/\omega_0$$

where A is an arbitrary constant and $\omega_0$ is a cutoff angular frequency when the low-frequency cutoff characteristics in the transfer characteristics in said first line are regarded as a primary transfer function.

5. The magnetic disk drive as set forth in claim 1, wherein, when an A/D convertor is disposed in said first transfer line, said equalization circuit comprises a digital filter having a transfer function expressed by the following formula:

$$E(s)=A\cdot[s^2+(\omega_0/Q)s+\omega_0^2]/\omega_0^2$$

where A is an arbitrary constant, $\omega_0$ is a cutoff angular frequency when the low-frequency cutoff characteristics in the transfer characteristics in said first transfer line are regarded as a secondary transfer function and Q is a quality factor associated with the gain in the low-frequency cutoff frequency.

* * * * *